Figure 1:
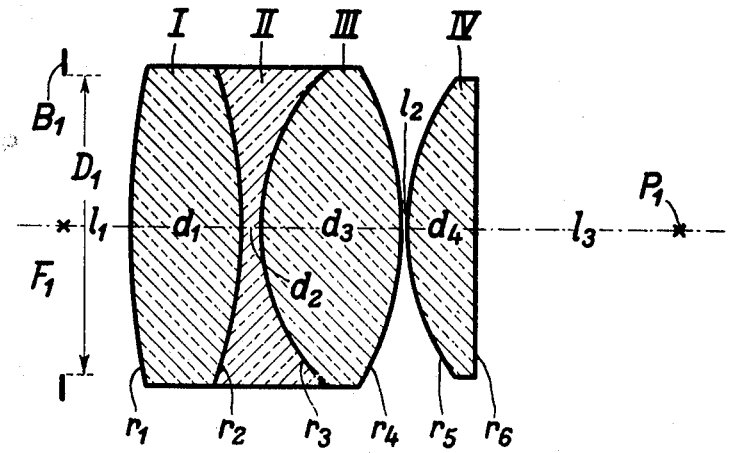

Oct. 8, 1940.                A. KÖNIG                    2,217,281
                          TELESCOPE EYEPIECE
                         Filed Jan. 18, 1939            2 Sheets-Sheet 1

|     | I, III | II | IV |
|---|---|---|---|
| $n_D$ = | 1.5687 | 1.7283 | 1.7015 |
| $\nu$ = | 63.1 | 28.3 | 41.1 |

| | | | |
|---|---|---|---|
| $l_1$ = | 27.3 | $D_1$ = | 120 |
| $d_1$ = | 45.0 | $r_1$ = | + 315.0 |
| $d_2$ = | 8.2 | $r_2$ = | − 193.0 |
| $d_3$ = | 57.0 | $r_3$ = | + 87.6 |
| $l_2$ = | 0.8 | $r_4$ = | − 128.0 |
| $d_4$ = | 28.5 | $r_5$ = | + 105.9 |
| $l_3$ = | 82.0 | $r_6$ = | ∞ |

Inventor:

Albert König

|  | V | VI, VII | VIII |
|---|---|---|---|
| $n_D =$ | 1.7283 | 1.5891 | 1.6200 |
| $\nu =$ | 28.3 | 61.2 | 36.3 |

| | |
|---|---|
| $l_4 = 67.7$ | $D_2 = 120$ |
| $d_5 = 6.5$ | $r_7 = +365.0$ |
| $d_6 = 48.4$ | $r_8 = +99.3$ |
| $l_5 = 0.6$ | $r_9 = -147.0$ |
| $d_7 = 48.4$ | $r_{10} = +101.5$ |
| $d_8 = 6.5$ | $r_{11} = -141.0$ |
| $l_6 = 64.0$ | $r_{12} = \infty$ |

Inventor:

Adolf König

Patented Oct. 8, 1940

2,217,281

UNITED STATES PATENT OFFICE 2,217,281

TELESCOPE EYEPIECE

Albert König, Jena, Germany, assignor to the firm of Carl Zeiss, Jena, Germany

Application January 18, 1939, Serial No. 251,464
In Germany January 28, 1938

4 Claims. (Cl. 88—57)

Telescope eyepieces having a large field of view, which are known by the name of wide-angle eyepieces, consist generally of three air-spaced elements if importance is attached to a comparatively great distance apart of the exit pupil and the eyelens. This distance depends on the sum of the distances apart of the elements. By reducing this sum, for instance to less than one third of the entire focal length of the eyepiece, it is possible to favourably influence the position of the exit pupil.

The invention concerns a telescope eyepiece comprising two air-spaced convergent elements in axial alignment, which have a distance apart that corresponds to at most one third of the focal length of the eyepiece and whose optically effective surfaces are spherical, the object-side element consisting of a plurality of lenses and having at least one convergent lens and a curved cemented surface bounding that lens of the object-side element which lies next to the eye, the concave side of this surface facing the eye, and the eyepiece having another cemented surface, the numerical value of the radius of curvature of which is greater than the focal length of the eyepiece. The said advantage offered by an eyepiece consisting of three elements can be made use of in a wide-angle eyepiece of the said kind by providing, according to the invention, that the numerical value of the quotient of the algebraic difference of the radii of curvature of that convergent lens of the object-side element which is next to the eye, less the lens thickness and divided by the product of these two radii of curvature is smaller than 1.55 times the reciprocal value of the focal length of the eyepiece. By fulfilling this condition, an eyepiece is obtained the state of correction of which generally comes up to the demands made.

A further improvement of the state of correction of the eyepiece in the sense of as zoneless a correction of the astigmatism as possible can be arrived at by using such glasses for the lenses of the object-side element that the mean value of the refractive indices of these lenses is greater than 1.6. The correction for coma is improved when the object-side element consists of two lenses only. Moreover, an eyepiece according to the invention is especially favourable for obtaining an extraordinarily great distance apart of the exit pupil and the element next to the eye when this element is constituted by a single convergent lens.

Figure 2:
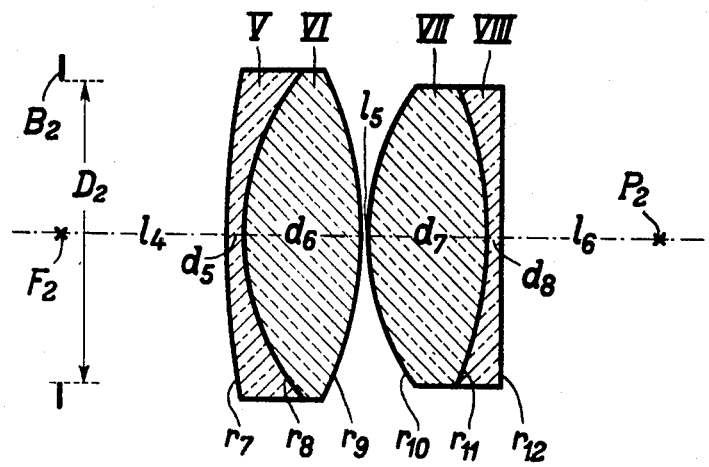

In the accompanying drawings, which illustrate two constructional examples of the invention, Figures 1 and 2 show the first and the second example, respectively, in schematical axial sections. The focal length of each of these two systems comprises 100 units of measurement.

The system according to the first example (Figure 1) consists of an object-side element, which is constituted by three cemented lenses I, II and III, and an element facing the eye, which is a single lens IV. In the second example (Figure 2), the object-side element consists of two cemented lenses V and VI and the element facing the eye of two cemented lenses VII and VIII. The front focal planes of the two constructional examples are indicated, respectively, by the foci $F_1$ and $F_2$ and by the image-field diaphragms $B_1$ and $B_2$. The positions of the exit pupils are indicated in the examples by the pupil centres $P_1$ and $P_2$, respectively. $r$ designates the radii and $d$ the thicknesses of the lenses. $D$ designates the diameters of the image-field diaphragms and $l$ the distances. The kinds of glass are determined by the refractive indices $n_D$ for the D-line of the solar spectrum and the Abbe conditions $\nu$.

The following Table 1 shows the kinds of glass, the Table 2 the diameters D of the image-field diaphragms, the Table 3 the distances $l$ and the thicknesses $d$, and the Table 4 the radii of curvature $r$ of the two constructional examples.

Table 1

|  | $n_D$ | $\nu$ |
|---|---|---|
| Lenses, I, III | 1.5687 | 63.1 |
| Lenses II, V | 1.7283 | 28.3 |
| Lens IV | 1.7015 | 41.1 |
| Lenses VI, VII | 1.5891 | 61.2 |
| Lens VIII | 1.6200 | 36.3 |

Table 2

$D_1 = 120$   $D_2 = 120$

Table 3

$l_1 = 27.3$   $l_4 = 67.7$
$d_1 = 45.0$   $d_5 = 6.5$
$d_2 = 8.2$   $d_6 = 48.4$
$d_3 = 57.0$   $l_5 = 0.6$
$l_2 = 0.8$   $d_7 = 48.4$
$d_4 = 28.5$   $d_8 = 6.5$
$l_3 = 82.0$   $l_6 = 64.0$

Table 4

$r_1 = +315.0$   $r_5 = +105.9$   $r_9 = -147.0$
$r_2 = -193.0$   $r_6 = \infty$   $r_{10} = +101.5$
$r_3 = +87.6$   $r_7 = +365.0$   $r_{11} = -141.0$
$r_4 = -128.0$   $r_8 = +99.3$   $r_{12} = \infty$

I claim:

1. An optical system for telescope eyepieces, comprising an object-side element and an element facing the eye in axial alignment, said elements being convergent and separated by air, the distance apart of said elements corresponding to at most one third of the focal length of said system, the optically effective surfaces of said system being spherical, said object-side element consisting of a plurality of lenses, at least one of said lenses being convergent, an optically effective surface of that of said lenses which is convergent and next to the eye being a curved cemented surface, the concave side of said cemented surface facing the eye, said optical eyepiece system having another optically effective cemented surface, the numerical value of the radius of curvature of said other cemented surface being greater than the focal length of said system, and 1.55 times the reciprocal value of the focal length of said system being greater than the numerical value of a quotient, the numerator of said quotient corresponding to a difference, the minuend of said difference corresponding to the algebraic difference of the radii of curvature of the optically effective surfaces of said convergent lens, next to the eye, of said object-side element, the subtrahend of said numerator corresponding to the thickness of said convergent lens, and the denominator of said quotient corresponding to the product of two last said radii of curvature.

2. In an optical system according to claim 1, the mean value of the refractive indices of said lenses constituting said object-side element being greater than 1.6.

3. In an optical system according to claim 1, said object-side element consisting of two lenses.

4. In an optical system according to claim 1, said element facing the eye being a single convergent lens.

ALBERT KÖNIG.